United States Patent [19]

Mizuta et al.

[11] Patent Number: 5,611,394
[45] Date of Patent: Mar. 18, 1997

[54] ROLL CHARGED WITH HEAT TRANSFER MEDIUM

[75] Inventors: Keiji Mizuta; Ritsuo Hashimoto; Yasuyoshi Takeoka, all of Hiroshima; Akira Kishida; Harumasa Muramoto, both of Chiba, all of Japan

[73] Assignees: Mitsubishi Jukogyo Kabushiki Kaisha, Tokyo; Kawasaki Steel Corporation, Hyogo-ken, both of Japan

[21] Appl. No.: 470,826

[22] Filed: Jun. 6, 1995

Related U.S. Application Data

[62] Division of Ser. No. 797,076, Nov. 25, 1991.

[30] Foreign Application Priority Data

Nov. 27, 1990 [JP] Japan .................... 2-123515
Nov. 27, 1990 [JP] Japan .................... 2-321036

[51] Int. Cl.$^6$ ............................................. F28D 11/02
[52] U.S. Cl. .................. 165/89; 165/104.21; 165/185; 219/469; 219/530; 219/540
[58] Field of Search .................. 165/89, 90, 86, 165/104.21, 185; 219/469, 470, 471, 530, 540

[56] References Cited

U.S. PATENT DOCUMENTS

| | | | |
|---|---|---|---|
| 963,892 | 7/1910 | Haskins | 219/540 |
| 1,430,222 | 9/1922 | Evans | 165/185 |
| 1,432,864 | 10/1922 | Johnston | 219/540 |
| 2,578,917 | 12/1951 | Bisch | 165/185 |
| 2,739,218 | 3/1956 | Wennerlund | 219/469 |
| 3,291,204 | 12/1966 | Norton . | |
| 3,619,539 | 11/1971 | Taylor | 219/469 |
| 4,091,264 | 5/1978 | Sarcia | 219/469 |
| 4,158,128 | 6/1979 | Eudokimou et al. | 219/469 |
| 4,172,976 | 10/1979 | Namiki et al. | 165/89 |
| 4,222,988 | 9/1980 | Barthel | 219/469 |
| 4,229,644 | 10/1980 | Namiki et al. | 165/89 |
| 4,526,533 | 7/1985 | Pabst | 165/104.21 |

FOREIGN PATENT DOCUMENTS

| | | |
|---|---|---|
| 0156790 | 10/1985 | European Pat. Off. . |
| 2185046 | 12/1973 | France . |
| 0125848 | 11/1978 | Japan .................... 219/469 |
| 61-147819 | 7/1986 | Japan . |
| 474762 | 8/1969 | Switzerland . |
| 0382062 | 10/1932 | United Kingdom .......... 219/540 |
| 528477 | 10/1940 | United Kingdom . |
| 619457 | 3/1949 | United Kingdom . |
| 925791 | 5/1963 | United Kingdom . |
| 2130341 | 5/1984 | United Kingdom . |

OTHER PUBLICATIONS

"Elektrische Heizeinrichtungen für Walzen und Trockenzylinder", Kunststoffe, vol. 43, No. 6, Jun. 1953, pp. P41–P42.

Primary Examiner—John K. Ford
Attorney, Agent, or Firm—Wenderoth, Lind & Ponack

[57] ABSTRACT

A roll charged with a heat transfer medium includes a heater which is easy to replace and measures by which the temperature in the axial direction of the roll can be kept uniform during operation. A hollow portion of the roll, which can be opened to the atmosphere, is located at a central axial portion of the roll. The heater is a rod-shaped heater and extends along the central longitudinal axis of the hollow portion. Metal having a low melting point is provided between the heater and an inner peripheral surface of the hollow portion. A heat transfer medium is charged in the hollow portion at the periphery thereof. The heat transfer medium may contact a circumferential part of the heater. In addition, a spiral groove or fin may be provided on an internal surface of the hollow of the portion of the roll body that is charged with the heat transfer medium.

11 Claims, 3 Drawing Sheets

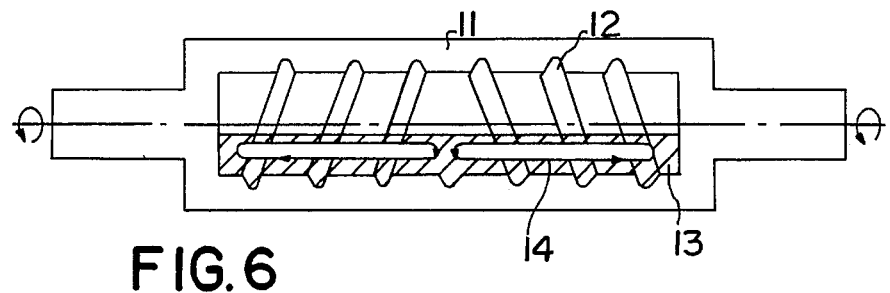
FIG. 6
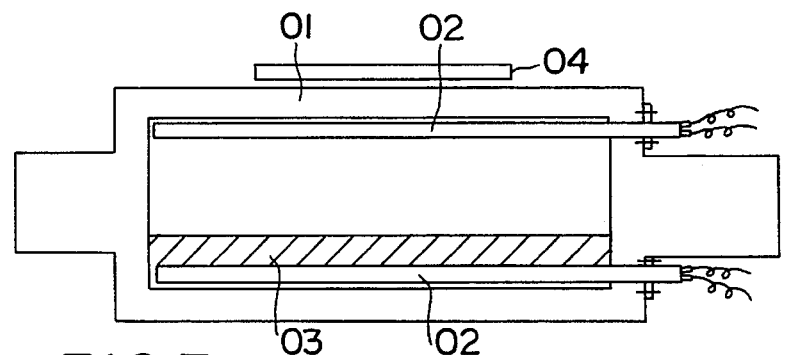
FIG. 7
PRIOR ART
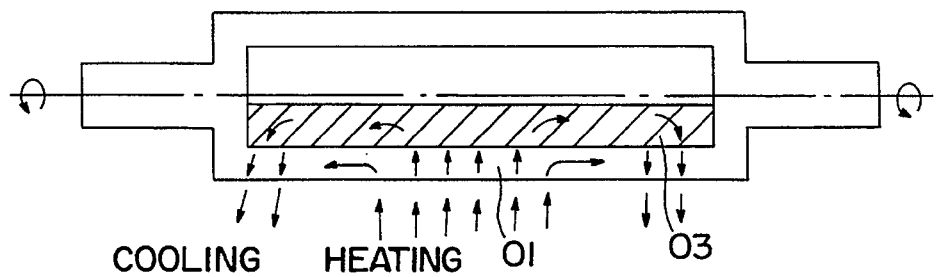
COOLING   HEATING   OI        O3
FIG. 8
PRIOR ART
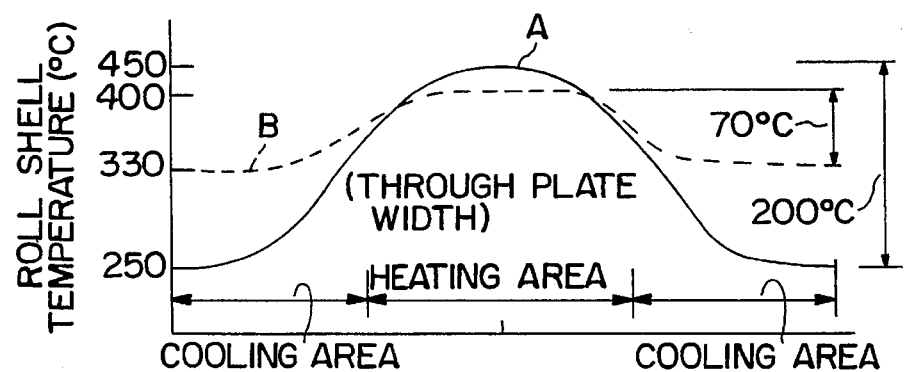
FIG. 9  DISTANCE IN ROLL AXIS DIRECTION

ROLL CHARGED WITH HEAT TRANSFER MEDIUM

This is a Divisional application of Ser. No. 07/797,076, filed Nov. 25, 1991.

BACKGROUND OF THE INVENTION

The present invention relates to a roll charged with a heat transfer medium, such as a wringer roll used in iron manufacturing machine process facilities, a heating roll used in a continuous annealing furnace, or a hurst roll used in continuous annealing facilities.

In a conventional roll charged with a heat transfer medium, a heater 02 is arranged close to an internal surface of a roll body 01 so as to come in contact with a heat transfer medium 03 charged inside the hollow roll body 01 as shown in FIG. 7. Further, reference numeral 04 indicates a plate conveyed over the roll so as to undergo heat exchange with the roll.

Further, as shown in FIG. 8, in another conventional roll charged with a heat transfer medium, the heat transfer medium 03 is charged in a roll body 01, the central part of the roll body 01 is heated by means of a plate passed over the roll, and natural convection of the heat transfer medium 03 and turbulence of the flow of the heat transfer medium 03 caused by rotation of the roll body transfer heat in addition to thermal conduction of the roll body 01. This roll charged with a heat transfer medium is used as a wringer roll and the like for wiping molten salt from a steel plate.

In the above-described conventional roll charged with a heat transfer medium shown in FIG. 7, the heat transfer medium must be exposed to atmospheric air when the heater is open-circuited and needs to be replaced. As a result, the roll must be removed from a line without leakage of the heat transfer medium when changing the position thereof. Further, it becomes necessary to evacuate the inside of the roll body after replacing the heater when a heat transfer medium having a vapor pressure lower than atmospheric pressure at room temperature is charged. Thus, there are a great deal of maintenance costs associated with the roll.

Further, in this conventional roll charged with a heat transfer medium, a difference in temperature between a central contact portion and end portions of the roll body is produced in an axial direction of the roll by a thermal load applied by a plate having liquid attached thereto which is conveyed over the roll. Thus, a uniform heat exchange cannot be performed between the plate and the roll, and a thermal crown is produced on the roll due to a temperature difference existing in the axial direction of the roll. The pressure exerted on the plate by the roll is therefore non-uniform in the axial direction of the roll.

In particular, in a heater roll (wringer roll) used in a process line of iron manufacturing machines for wiping liquid from a steel plate at a high temperature, the roll temperature rises markedly only at the area of contact between the roll body and the steel plate in the axial direction of the roll as the steel plate at a high temperature passes thereby. The temperature of the roll at the end portions thereof remains low. Thus, the above-described problems are notable at the roll end portions. In addition, the temperature at the roll end portions becomes lower than the temperature at which the wiped liquid will solidify. As a result, there is such a drawback in that solidified matter accumulates at the roll end portions, which makes continuous operation impossible.

Further, when the above-described conventional roll charged with a heat transfer medium shown in FIG. 8 is used as a wringer roll, a temperature difference of approximately 200° C. is produced in the roll body in the axial direction of the roll body, as shown with a curve A in FIG. 9, between a heated central part of the roll body in contact with the steel plate and at the end portions of the roll body out of contact with the plate. This temperature difference is caused by the thermal load of the plate when the plate passes over the roll and due to the fact that the heat transfer capacity of the charged heat transfer medium is high only in the circumferential direction of the roll because of the rotation of the roll, and the heat transfer capacity in the axial direction is small since heat transfer caused by the turbulence of the heat transfer medium flow and by natural convection only is generated in the axial direction of the roll. As a result, the roll body has such problems as a thermal crown being produced, thus lowering the performance of the roll in wiping the conveyed material and allowing the wiped liquid at the end portions of the roll to solidify.

SUMMARY OF THE INVENTION

It is an object of the present invention to solve the above-described problems of a conventional roll charged with a heat transfer medium.

To achieve this object, the following measures have been taken in a roll charged with a heat transfer medium according to the present invention.

(1) A hollow section which can be opened to atmospheric air is provided in a central axial portion of the roll, a rod-shaped heater extends along the central axis of the roll within the entirety of the hollow section, metal having a low melting point is interposed between the heater and the hollow section, and a heat transfer medium is charged in a second intermediate section at the periphery of the hollow section.

(2) A hollow section which can be opened to atmospheric air is provided at a central axial portion of the roll, a rod-shaped heater extends along the central axis of the roll within the entirety of the hollow section, a heat transfer medium is charged in the hollow section in an amount greater than that necessary to moisten a circumferential part of the heater, and the heat transfer medium vapor mole fraction in a vapor phase in the roll is set at 80% or more in the temperature range experienced while the roll is in use.

(3) A spiral groove or a fin is provided on an internal surface of the hollow roll body charged with a heat transfer medium.

According to the present invention described in the above item (1), the metal having a low melting point is melted by a heater and the heat generated by the heater is transferred to the heat transfer medium through a pocket, whereby the roll is heated with high heat transport efficiency.

When the heater is replaced, the heater is taken out of the roll by opening the pocket to atmospheric air after heating the roll to the melting point or higher of the metal having a low melting point. Thus, the heater can be replaced easily irrespectively of the heat transfer medium without exposing the heat transfer medium in the roll to atmospheric air. Further, it is possible to replace the heater with the heater roll kept on-line.

In the present invention described in the above item (2), the heat transfer medium moistens at least a circumferential part of the heater, whereby the heat transfer medium is heated uniformly in the axial direction of the roll by means of the heater. When the roll is subject to the thermal load by the plate which travels thereover and the temperature of the roll rises at the central part thereof, the heat transfer medium heated by the heater evaporates in the area where the temperature has risen, and the vapor thereof flows in the axial direction of the roll and condenses on a low temperature portion of the internal surface of the roll body, thus applying heat of condensation to this part. The heat transfer medium thus effects a heat transport operation as a heat pipe, and the temperature at all interior parts of the roll body where the heat transfer medium vapor mole fraction is at 80% or more in the vapor phase in the roll. Thus, condensation of the heat transfer medium vapor on a wall surface of a low temperature portion of the roll will not be inhibited, and a uniformity in the temperature of the roll is achieved sufficiently. Thus, a thermal crown is not produced on the roll and thus the pressure exerted by the roll against the plate becomes constant. Further, the temperature at the roll end portions rises, thus preventing the liquid wiped off of the plate from solidifying.

Furthermore, the entire roll is preheated uniformly to a predetermined temperature by actuating the heater before the plate passes over the roll.

In the present invention described in the above item (3), when the roll rotates, the heat transfer medium flowing along the internal surface of the roll body also produces convection in the axial direction by means of the spiral groove or the fin. The heat transport in the axial direction of the roll is accelerated with the convection, and the temperature difference in the axial direction of the roll body is reduced.

BRIEF DESCRIPTION OF THE DRAWINGS

FIG. 1 is a schematic of a first embodiment of a wringer roll according to the present invention, in which

FIG. 6 is a side view, partially in section, of a third embodiment of the resent invention;

FIG. 7 is a side view, partially in section, of a conventional wringer roll;

FIG. 8 is a side view, partially in section, of a conventional roll charged with a heat transfer medium; and FIG. 9 is a graph of temperature distributions in the axial direction of the third embodiment of the roll according to the present invention and of a conventional roll charged with a heat transfer medium.

DETAILED DESCRIPTION OF THE PREFERRED EMBODIMENTS

Figure 1C:
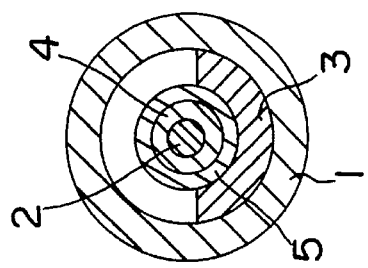
Figure 1A:
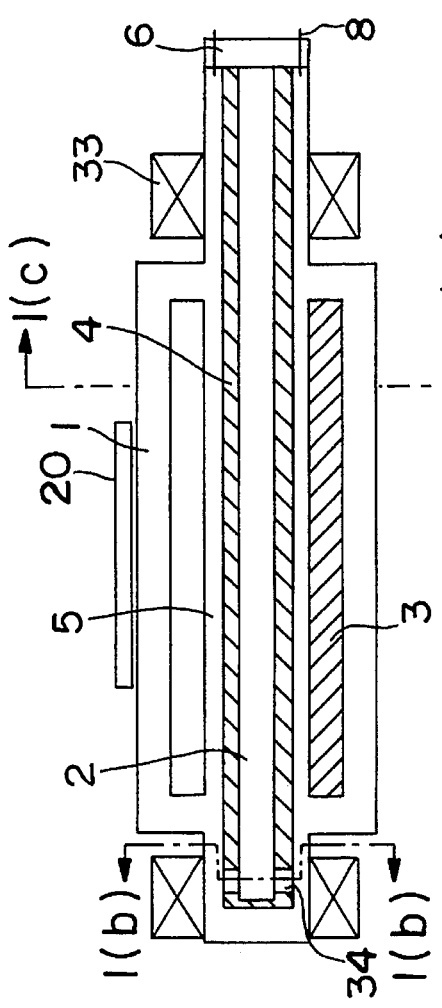
FIG. 1(a) is a longitudinal sectional view and FIGS. 1(b) and (c) are sectional views taken along lines A—A and B—B in FIG. 1(a), respectively.
Figure 1B:
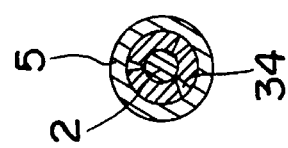

A first embodiment of the present invention will be described with reference to FIG. 1.

The first embodiment is a wringer roll for wiping from a steel plate molten salt which is attached to the steel plate at a temperature of approximately 450° C. The wringer roll includes a hollow roll body 1 including an outer cylindrical wall and an inner tubular (cylindrical) wall 5 extending over the entire axial extent of a central part of the roll and disposed concentrically within the outer wall. K, Na, molten salt, Dowtherm A (a mixture of diphenyl and diphenyl oxide), Hg and the like are charged as a heat transfer medium 3 in a space between the inner wall 5 and the outer wall of the roll body 1. The inner wall 5 contains a rod-shaped heater 2 extending along a longitudinal axis of the roll and wood metal (Bi 55%, Pb 45%) 4 as metal having a low melting point. One end of the inner wall 5 is closed by part of the roll body 1, and the other end is closed by means of a cover (cap) 6 fitted to the inner wall 5 by bolts 8, thus forming a pocket. A cable feeds electric current to the heater 2. Reference numeral 20 denotes a steel plate which is acted on by the wringer roll.

The heat transfer medium 3 is charged into the roll body 1 so as to moisten at least a circumferential part of the inner wall 5, and the vapor mole fraction of the heat transfer medium 3 in a vapor phase in the roll body 1 is set to be 80% or more in the temperature range which is experienced while the roll is used by preliminarily exhausting gas other than the heat transfer medium from the roll body 1.

The present embodiment is assembled as follows.

(1) The outer wall of the roll body 1, the inner wall 5 thereof, a bearing 33, the heater 2, the heat transfer medium 3 and the metal having a low melting point (wood metal) 4 are prepared.

(2) The outer wall and the inner wall 5 of the roll body are welded via an end plate.

(3) Two holes are opened in the end plate on one side, and the roll body 1 is arranged vertically so that these holes face upward.

(4) The heat transfer medium is injected through one hole while air is exhausted through the other hole.

(5) Even after the heat transfer medium is injected in such a predetermined quantity that at least a circumferential part of the inner wall is moistened, air continues to be exhausted until the above-described vapor mole fraction of the heat transfer medium is obtained.

(6) The two holes are sealed by welding.

(7) Metal having a low melting point (wood metal) is put into the inner wall from the upper end portion thereof. The quantity of the metal is such that all clearances will be filled after the heater is inserted later.

(8) The heater 2 to be heated to the melting point of the metal having a low melting point (124° C. for the wood metal) is inserted within the inner wall while melting the metal having a low melting point. The end portion of the heater is fixed to the inner wall with bolts, and the cover 6 is fitted to the end surface of the inner wall with the bolts 8 so as to close the inside of the inner wall. Further, reference numeral 34 denotes a supporting bolster.

(9) Heating with the heater is stopped, and the roll is oriented to extend horizontally.

In the present embodiment, when the heater 2 is electrified, the wood metal 4 having a low melting point becomes molten first, and the heat transfer medium 3 located in the space between the inner wall 5 and the outer wall of the roll body 1 is heated, thus heating the roll body 1. Since the wood metal 4 occupies the space between the heater 2 and the inner wall 5, heat transfer is effected with heat transport efficiency.

When the heater 2 is replaced, the whole roll is heated to the melting point (124° C.) or higher of the wood metal 4 so as to melt the wood metal 4. It is possible to remove the heater 2 from the inner wall 5 after removing the cover 6 in this state. At this time, the heat transfer medium 3 is not exposed to atmospheric air and the heat transfer medium 3 does not leak. Further, the interior of the roll does not have to be vacuum pumped after the heater is replaced.

Further, since at least a part of the periphery of the inner wall 5 is moistened by the heat transfer medium 3, the heat transfer medium 3 is heated uniformly in the axial direction of the roll body 1 to nearly the same temperature. When the roll body 1 is subject to a thermal load by the steel plate 20 which passes thereover and the temperature thereof rises partially, in the area where the temperature has risen, the heat transfer medium 3 heated by the heater 2 as described above is evaporated, the vapor thereof flows in the axial direction of the roll body 1 and condenses on a low temperature portion of an inner peripheral surface of the roll body 1, and this portion is affected by the heat of condensation. In such a manner, the heat transfer medium 3 acts as a heat pipe, and the temperature at all interior parts of the roll where the heat transfer medium vapor can reach is made uniform.

By making the temperature in the axial direction of the roll body 1 uniform a thermal crown is prevented from occurring on the roll body 1, the pressing pressure against the steel plate 20 becomes constant, and the capacity of the roll to wipe liquid from the steel plate will never be reduced. Further, the temperature at the end portions of the roll body 1 rises and the wiped liquid is prevented from solidifying due to the uniform temperature in the axial direction of the roll body 1.

Furthermore, it is possible to preheat the roll body 1 uniformly to a predetermined temperature in the axial direction of the roll body 1 by actuating the heater 2 before passing a plate over the roll body 1.

Moreover, although wood metal has been mentioned as employed by the present invention, an alloy including Pb at 0 to 95% by weight, Bi at 0 to 70% by weight and Si at 0 to 70% by weight may be used instead.

A second embodiment of the present invention will be described with reference to FIG. 2.

The second embodiment is also a wringer roll for wiping away molten salt which has adhered to a steel plate at the temperature of approximately 450° C. Potassium is charged as the heat transfer medium 3 in the hollow section of the roll body 1, and a rod-shaped sheath heater extends along the central longitudinal axis of the roll body 1. The sheath heater 10 is connected with a power source 12 by a cable 11. Further, the sheath heater 10 is detachably fitted to one end portion of the roll body 1 by bolts 13 at a flange portion 10a constituting a cap.

Further, the heat transfer medium 3 is charged in the hollow section of the roll body 1 in an amount corresponding to 50% of the volume of the space in the hollow section of the roll body 1 so as to moisten about a diametrical half of the circumferential portion of the sheath heater 10. (The vapor pressure of potassium at 20° C. is 0.0001 Torr or less.) Further, gas other than the heat transfer medium in the roll body 1 is exhausted until the vapor pressure of components other than the heat transfer medium in a vapor phase in the roll body 1 is set at 0.01 Torr or less at 20° C.

Since approximately a diametrical half of the sheath heater 10 is moistened by the heat transfer medium 3, the heat transfer medium 3 is heated to almost the same temperature uniformly in the axial direction of the roll. When the roll body 1 is subject to a thermal load by the steel plate 20, which is passed thereover, and the temperature of a central part thereof rises, the heat transfer medium 3 heated by the sheath heater 10 is evaporated in the area where the temperature has risen, the vapor thereof flows in the axial direction of the roll and condenses on the low temperature portion of the internal surface of the roll body 1, and this portion is affected by the heat of condensation. In this manner, the heat transfer medium 3 acts as a heat pipe, and the temperature at all interior parts of the roll body 1 where the heat transfer medium vapor can reach is made uniform.

Moreover, when a steel plate at the temperature of approximately 450° C. passes over the central portion of the roll body, the temperature of the roll reaches approximately 400° C. and the vapor pressure of potassium as the heat transfer medium rises to 4 Torr, whereas the vapor pressure other than potassium is at $0.01 \times 673/293 = 0.02$ Torr, and the heat transfer medium vapor mole fraction becomes 0.995. Accordingly, condensation of the heat transfer medium vapor on the wall surface at a low temperature is not inhibited, and the temperature inside the roll body 1 can be made sufficiently uniform.

As described above, in the present embodiment, a thermal crown is prevented from occurring on the roll body 1, the pressure exerted by the roll body 1 against the steel plate 20 is constant, and the ability of the roll to wipe liquid from the plate is not deteriorated, because the temperature in the axial direction of the roll body 1 is uniform. Further, by making the temperature in the axial direction of the roll body 1 uniform, the temperature at the end portions of the roll body 1 will be such that wiped liquid will not solidify there.

Furthermore, it is possible to preheat the roll body 1 uniformly in the axial direction of the roll by actuating the sheath heater 10 before the steel plate 20 passes thereover.

An experimental example of the present invention will be described hereinafter.

Figure 2:
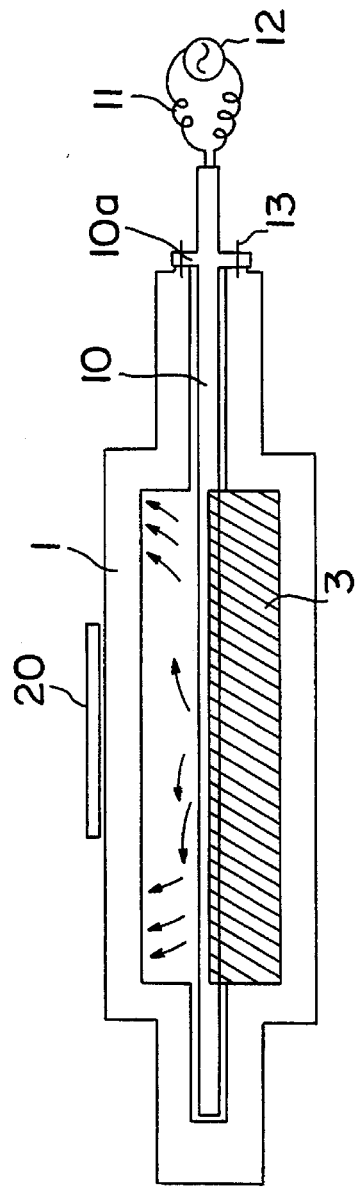
FIG. 2 is a longitudinal sectional view of a second embodiment of a wringer roll according to the present invention.
Figure 3:
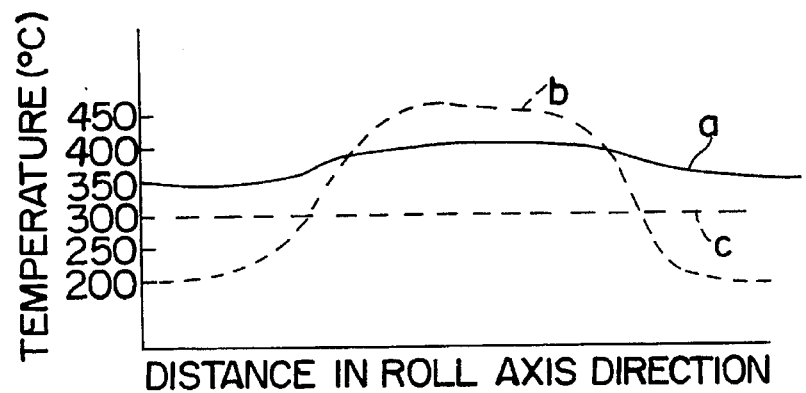
FIG. 3 is a graph of the temperature distributions in an axial direction of an experimental example of a roll according to the present invention and a conventional roll.

An apparatus including a roll body having an outside diameter of 100 mmϕ, an inside diameter of 80 mmϕ and a length of 2,000 mm according to the second embodiment shown in FIG. 2 was used, and potassium was charged as the heat transfer medium in the roll in such an amount as to occupy 50% of the space between the roll body and heater. Further, the pressure in a vapor phase of components other than potassium in a vapor phase was set at 0.01 Torr or less. A curve a in FIG. 3 shows the temperature distribution of the roll when a steel plate at 450° C. passes thereover at 100 mpm. On the other hand, curve b shows the temperature distribution in a conventional hollow wringer roll. The temperature difference in the axial direction of the roll of the present invention is ⅓ of that in the conventional roll. Thus, the thermal crown is also ⅓ or less. Further, although the temperature of the ends of the conventional roll can fall below temperature c (the solidifying point of the molten salt) the temperature of the roll ends of the present embodiment remains at c or higher so that the salt at the roll ends is in a dissolved state.

Figure 4:
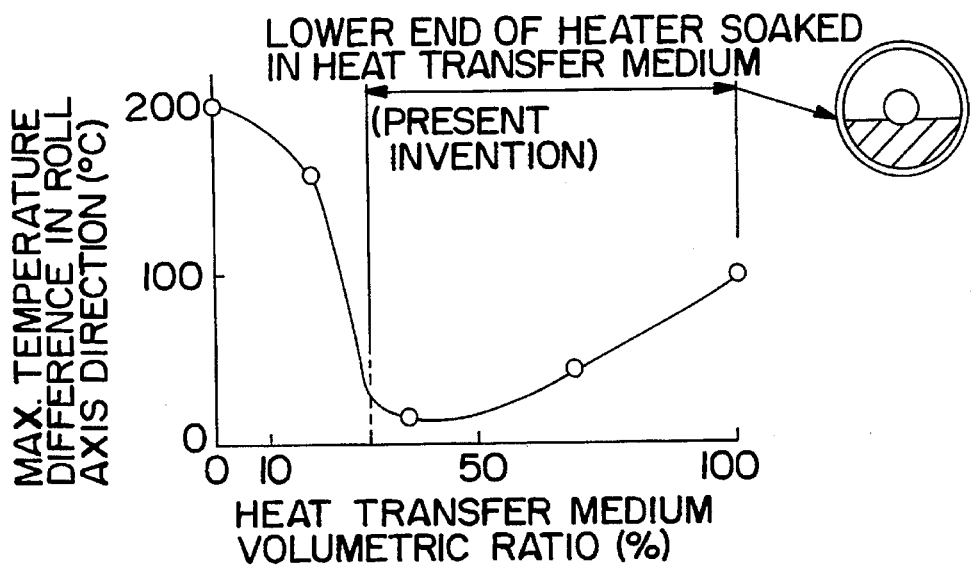
FIG. 4 is a graph showing the relationship between the maximum temperature difference in the axial direction of the roll and the heat transfer medium charging volumetric ratio in an experimental example of the present invention.

FIG. 4 shows the maximum temperature difference in the axial direction of the roll when the charged quantity of the heat transfer material is changed in the above-described experimental example of the present invention. When the amount of heat transfer medium is insufficient to moisten (contact) the heater, the heat supplied to the heat transfer material from the heater is reduced sharply, and the temperature difference at the respective portions of the roll becomes larger.

Figure 5:
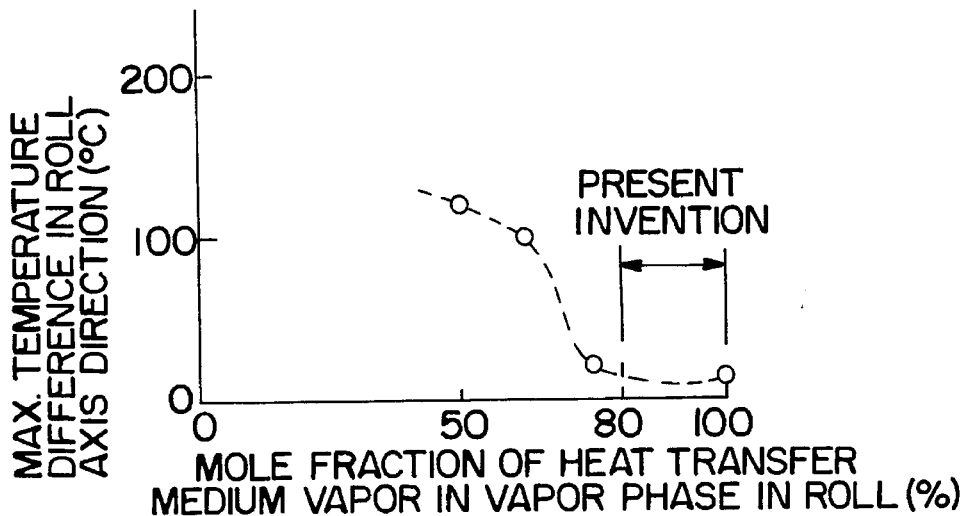
FIG. 5 is a graph showing the relationship between the maximum temperature difference in the axial direction of the roll and the heat transfer medium vapor mole fraction.

FIG. 5 shows the relationship between the heat transfer medium vapor mole fraction in a vapor phase in the roll and the maximum temperature difference in the axial direction of the roll in the above-described experimental example of the present invention. When the ratio of vapor other than heat transfer medium vapor reaches 20% or more, the heat transfer occurs less effectively because condensation of the heat transfer medium vapor on the wall surface of the low temperature portion is inhibited, and the temperature difference becomes larger.

A third embodiment of the present invention will be described with reference to FIG. 6. The present embodiment is also a wringer roll used in the process line of an iron manufacturing machine.

A spiral groove 12 is provided on an internal surface of a hollow roll body 11 charged with a heat transfer medium 13. The groove 12 is in the form of spiral grooves extending symmetrically in opposite directions from the central axial portion of the roll body 11, respectively.

In the present embodiment, due to the groove 12, the heat transfer medium 13 flows toward the ends of the roll body 11 in the axial direction of the roll shell 11 upon rotation of the roll body. Convection also occurs in the axial direction as shown by reference numeral 14 in FIG. 6. Accordingly, heat transport is accelerated in the axial direction of the roll, thus making it possible to obviate a temperature difference in the axial direction of the roll body.

Thus, in a conventional wringer roll, salt will solidify at both ends thereof because of the low temperature of the ends of the roll body. In the present embodiment, however, salt does not solidify because the end portions of the wringer roll also reach a temperature close to that of the central portion, thus making it possible to remove the sale in its liquid form and making maintenance of the wringer roll unnecessary.

A curve B in FIG. 9 shows the temperature of the roll body of the present invention when potassium is used as the heat transfer medium, the heat transfer medium is charged in a quantity of 50% of the interior space of the roll body, and the roll body is rotated at 300 rpm. As compared to the curve A showing the temperature of a roll body of a conventional wringer roll under the same conditions, the temperature difference according to the present embodiment in the axial direction is ½ or less.

Although the present embodiment has been described as having a spiral groove on the internal surface of the roll body, a similar operation and similar effects may be achieved by providing a spiral fin instead of the groove.

As explained above, conventionally, when a heater of a roll charged with a heat transfer medium is replaced, the roll is removed from a line and returned on-line after ensuring that the heat transfer medium of the roll has not leaked, thus requiring tremendous costs. According to the present invention, however, metal having a low melting point and a heater are contained in a pocket in the roll body which can be opened to atmospheric air. Therefore, it is possible to replace the heater while the roll is kept on-line irrespective of the heat transfer medium. Thus, maintenance costs are low.

Also according to the present invention measures are taken to make the temperature in the axial direction of the roll uniform to reduce the thermal crown on the roll. With this, when a plate is wiped while passing through the nip of coacting rolls incorporating the present invention, the wiped liquid at the ends of the roll will not solidify, thus making it possible to eliminate certain maintenance of the roll. For example, it is possible to cause the heat transfer medium to flow in the axial direction of the roll body to reduce the temperature difference in the axial direction of the roll body by providing a spiral groove or fin on the internal surface of the hollow roll body charged with a heat transfer medium.

We claim:

1. A roll charged with a heat transfer medium, comprising:

a hollow roll body comprising an outer cylindrical wall, an inner cylindrical wall, a closed space defined between said inner cylindrical wall and said outer cylindrical wall, and a hollow portion defined by said inner cylindrical wall extending axially along said hollow roll body inside said inner cylindrical wall;

a removable cover on said hollow roll body that closes said hollow portion;

a heat transfer medium charged inside said closed space;

a rod-shaped heater extending axially inside said hollow portion; and a metal filled in said hollow portion around said rod-shaped heater between said rod-shaped heater and said inner cylindrical wall, said metal having a melting point such that said metal is capable of being melted by said rod-shaped heater.

2. The roll of claim 1, wherein said heat transfer medium is selected from the group consisting of K, Na, a mixture of diphenyl and diphenyl oxide, and Hg.

3. The roll of claim 2, wherein said metal filled in said hollow portion is selected from the group consisting of wood metal and an alloy of: Pb provided in a quantity of 0 to 95% by weight, Bi provided in a quantity of 0 to 70% by weight and Si provided in a quantity of 0 to 70% by weight.

4. The roll of claim 1, wherein said metal filled in said hollow portion is selected from the group consisting of wood metal and an alloy of: Pb provided in a quantity of 0 to 95% by weight, Bi provided in a quantity of 0 to 70% by weight and Si provided in a quantity of 0 to 70% by weight.

5. The roll of claim 1, wherein said removable cover comprises a cap bolted to one end of said roll body so as to cover one end of said hollow portion.

6. The roll of claim 1, wherein said inner cylindrical wall and said hollow portion extend axially beyond opposite axial ends of said space between said inner cylindrical wall and said outer cylindrical wall and said rod-shaped heater extends in said hollow portion beyond said opposite axial ends of said space.

7. The roll of claim 6, wherein said inner cylindrical wall comprises end portions on either side of and axially beyond said space, said end portions being rotatably supported by respective bearings.

8. The roll of claim 6, wherein said rod-shaped heater is supported at one end of said hollow portion by a supporting bolster and at the other end by bolts, said cover closing said hollow portion at the other end.

9. The roll of claim 1, wherein said rod-shaped heater is at least axially coextensive with said outer cylindrical wall.

10. The roll of claim 1, wherein said heat transfer medium has a vapor mole fraction in a vapor phase of at least 80%.

11. The roll of claim 1, wherein said metal filled in said hollow portion and said heat transfer medium are separated only by said inner cylindrical wall, and said rod-shaped heater and said inner cylindrical wall are separated only by said metal.

* * * * *